United States Patent [19]

Avakian

[11] Patent Number: 5,427,193

[45] Date of Patent: Jun. 27, 1995

[54] DRIVE SYSTEM FOR WHEELCHAIRS OR THE LIKE

[75] Inventor: Emik A. Avakian, Chicopee, Mass.

[73] Assignee: Datatran Inc., Chicopee, Mass.

[21] Appl. No.: 49,118

[22] Filed: Apr. 19, 1993

[51] Int. Cl.⁶ .................................................. B60K 7/00
[52] U.S. Cl. .................................. 180/65.5; 180/65.6;
180/907; 318/138; 318/139
[58] Field of Search ............... 310/83, 112, 113, 67 R;
318/138, 139, 480; 322/26, DIG. 4; 180/65.5,
220, 907, 65.6

[56] References Cited

U.S. PATENT DOCUMENTS

| | | | |
|---|---|---|---|
| 3,477,536 | 11/1969 | Carini | 180/65.5 |
| 3,497,026 | 2/1970 | Calvert | 180/165 |
| 3,908,776 | 9/1975 | Dudley | 180/65.5 |
| 4,109,741 | 8/1978 | Gabriel | 180/65.5 X |
| 4,634,941 | 1/1987 | Klimo | 318/139 |
| 5,186,269 | 2/1993 | Avakian et al. | 180/907 X |
| 5,274,311 | 12/1993 | Littlejohn | 318/139 X |

Primary Examiner—Margaret A. Focarino
Assistant Examiner—Michael Mar
Attorney, Agent, or Firm—Chilton, Alix & Van Kirk

[57] ABSTRACT

A drive system, suitable for use as a self propelled wheel on a wheelchair or the like, includes a wheel which rotates about a stationary axle assembly. The torque producing electrical motor and the batteries which supply power therefor are mounted on and rotate with the wheel. Command signals are optically coupled from the frame on which the stationary axle is supported to the rotating wheel where they are employed to control the rotational speed and direction of rotation.

20 Claims, 6 Drawing Sheets

DRIVE SYSTEM FOR WHEELCHAIRS OR THE LIKE

BACKGROUND OF THE INVENTION

1. Field of the Invention

The present invention relates to the conversion of electrical power into torque and particularly to controllably causing an electrically powered wheel to rotate about a stationary axle without requiring the delivery of electrical energy to the wheel from the vehicle which supports the axle. More specifically, this invention is directed to an electrical drive system wherein the source of electrical current and the electro-mechanical components which convert the source current into torque are housed within the confines of a wheel and especially to such a drive system wherein the command signals from a vehicle mounted control signal generator are optically coupled to the wheel. Accordingly, the general objects of the present invention are to provide novel and improved methods and apparatus of such character.

2. Description of the Prior Art

While not limited thereto in its utility, the present invention is particularly well suited for use on light-weight vehicles which include a pair of large, rearwardly disposed drive wheels such as, for example, the well known foldable wheelchair. There has been a long standing need for an efficient and reliable drive system which would permit wheelchairs characterized by a dual-planar, tubular frame construction to be motorized. For a discussion of prior efforts to provide motorized wheelchairs, reference may be had to the present inventor's U.S. Pat. No. 5,186,269 and the prior art of record therein.

The solution to the problems incident to retrofitting a manually powered wheelchair with an electomechanical drive disclosed in U.S. Pat. No. 5,186,269 constituted a significant step forward in the art. However, further improvements, and particularly a reduction in complexity with a simultaneous increase in efficiency, have been sought. For example, in the patented system, torque was delivered to the rims of the drive wheels via lever arms having a length which were maximized for the particular chair. Also, a comparatively heavy battery pack was removably suspended from the rear portion of the chair frame thus tending to unbalance the chair.

SUMMARY OF THE INVENTION

The present invention provides a novel drive system, particularly well suited for use in motorizing a conveyance such as a foldable wheelchair. The drive system of the invention is effectively a self-propelled wheel which is characterized by a high degree of operational efficiency. This novel self-propelled wheel adds comparatively little weight to the vehicle upon which it is installed. The present invention thus constitutes an improvement over the prior art as discussed in U.S. Pat. No. 5,186,269 and, at the same time, a novel alternative to the patented drive system. A principal disinction between the present and patented inventions resides in the fact that the present invention minimizes the generated torque which acts in a direction opposite to the torque which rotates the wheel. This minimization of oppositely acting torque is acheived by shortening, to the degree possible, the length of the lever arm of the torque delivered to the frame of the chair on which the wheel is mounted. This is opposite to the technique of employing lever arms of maximum length to transmit torque to the wheel rim as taught in U.S. Pat. No. 5,186,269.

A drive system in accordance with the present invention is, with the exception of the command signal generator, essentially completely housed within each wheel. Thus, the source(s) of electrical energy and the electro-mechanical components which convert the electrical energy into torque which causes rotation of the wheel are all mounted within the confines of the wheel. The wheel turns about a non-rotating compound axle assembly which is coupled to the frame of the vehicle. In accordance with a preferred embodiment, a pair of direct current sources and a single drive motor are mounted on the wheel and are positioned relative to the axle assembly so as to provide a balanced wheel which includes a structural support and a tire rim.

The torque producer of the present invention is a high efficiency disc type direct current motor. This motor employs discs of relatively large size. A first disc serves as the motor rotor and one or more further discs function as the stator. The rotor is mechanically coupled to a stationary component of the vehicle while the stator disc(s) are attached to the wheel rim. The rotor coupling is accomplished by means of a drive train which includes a stationary planetary gear. Energization of the motor results in the motor, and thus the wheel and batteries, being driven about the stationary gear which is coaxial with axle assembly.

The present invention also encompasses a novel arrangement for delivering command signals, generated through the action of the user of the vehicle, between the non-rotating and rotating components of the wheel. In accordance with a preferred embodiment, the command signals are converted into optical signals. These optical signals are transmitted across a gap located at or near the axis of rotation of the wheel. At this gap, i.e., in an optical signal coupling chamber, the transmitters and receivers of the control signal delivery arrangement may be located in concentric circular arrays thereby permitting the transmission of plural channels of information between the command signal generator and the wheel. The plural channels permit the delivery of command signals to the wheel and the feedback of information from the wheel to the command signal generator without the use of a commutator. The optically transmitted command signals are converted into electrical signals and amplified within the wheel and subsequently employed to derive the proper timing, current and voltages to control the motor.

In accordance with one embodiment, the optical signals which are fed back from the wheel to the command signal generator on the chair frame are employed to develop current used to recharge the battery which provides operating power to the command signal generator. This enables the battery at the command signal generator to be maintained in a substantially fully charged state by energy provided by the wheel mounted batteries.

The command and/or feed-back signals employed in the practice of the invention may be transmitted over plural fiberoptic bundles. In such case, where the optical signal transmission paths have to interface between the stationary and rotating members in the optical chamber, the interface is located at or next to the axis of rotation. While the interface must be coaxial with the axis of rotation, it does not have to be in the same plane as the wheel, i.e., the interface may be part of the axle assembly.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
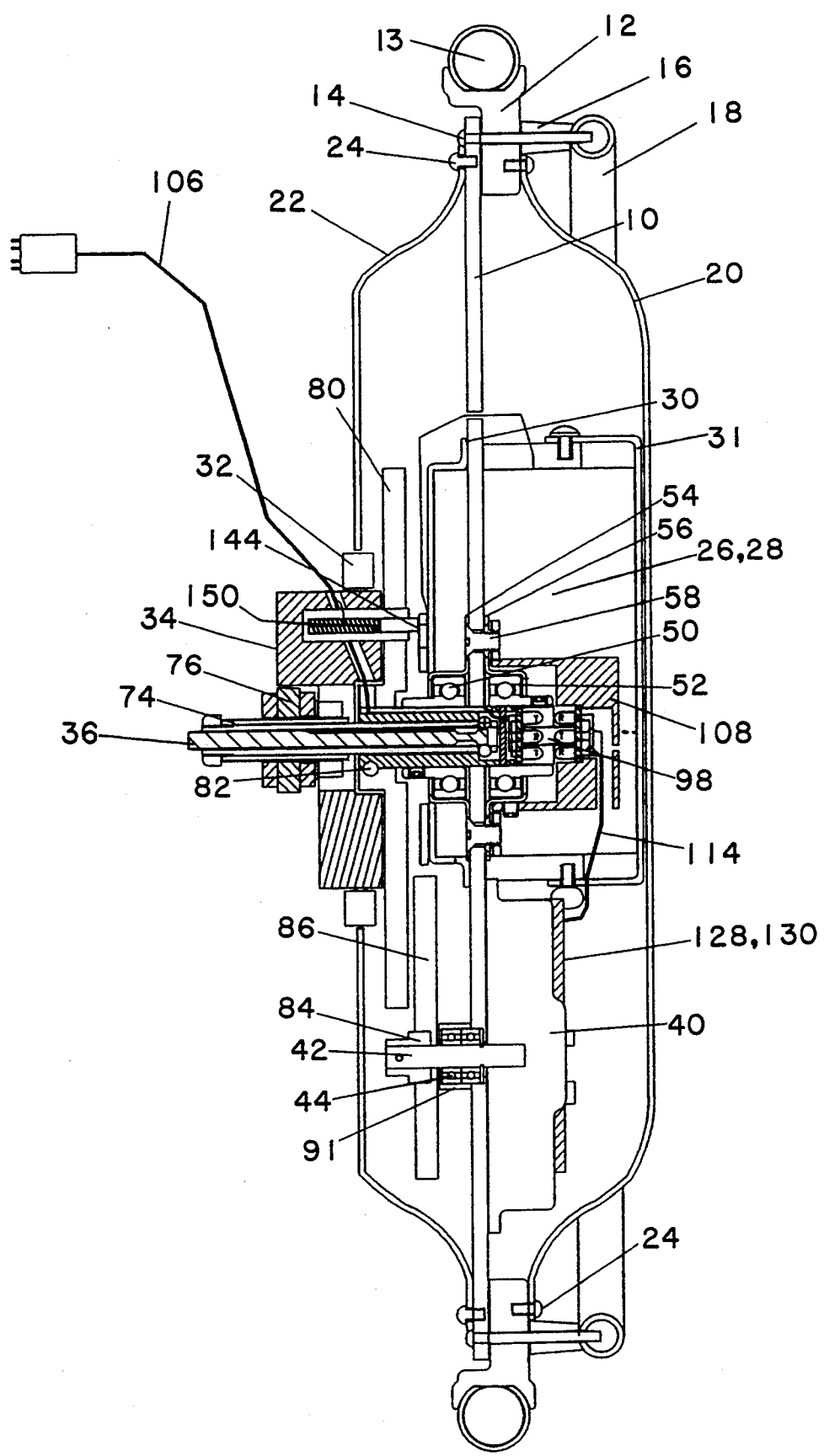
FIG. 1 is an elevational view, partly in section, of a self-propelled wheel in accordance with the present invention, FIG. 1 being a view taken along the line 1—1 of FIG. 4.
Figure 4:
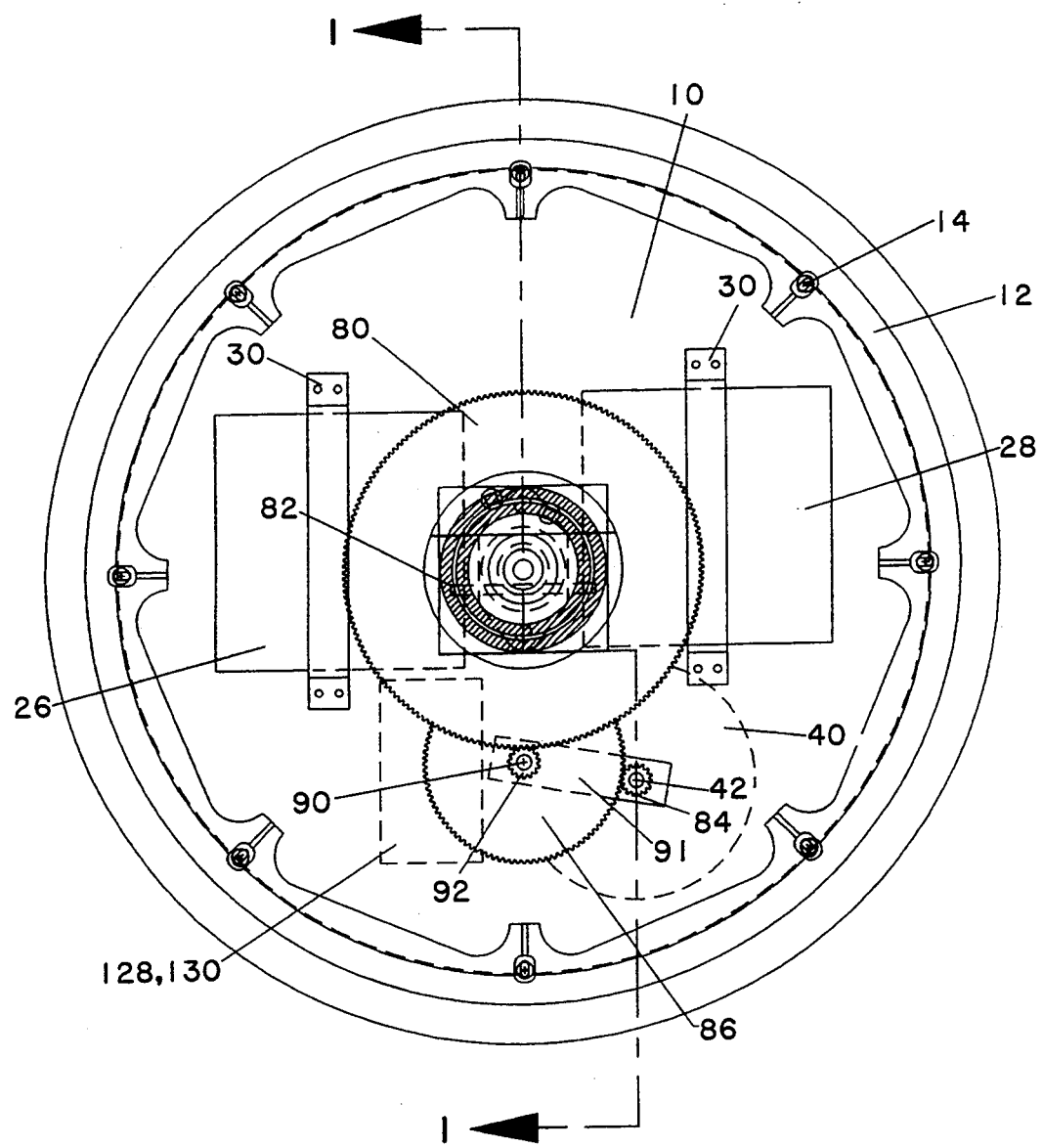
FIG. 4 is a side elevation view, partly in section, of the self-propelled wheel of FIG. 1, FIG. 4 being a view taken transversely with respect to the view of FIG. 1.

With reference now to the drawings, and particularly FIGS. 1 and 4, a wheel in accordance with the disclosed embodiment of the present invention includes a support plate 10 which will typically be fabricated from a lightweight, high strength metal such as aluminum. A rim defining member 12, which receives a tire 13, is affixed to plate 10, in any suitable manner, so as to extend outwardly from the plate. In the disclosed embodiment, the rim defining member 12 is attached to plate 10 by means of bolts 14 which extend through the plate, the rim defining member 12 and spacers 16. Bolts 14 engage a hand rim 18. The hand rim 18 will be provided to permit a wheelchair on which the self-propelled wheel of the present invention is installed to be propelled manually.

The wheel of the disclosed embodiment is provided with a pair of plastic covers 20 and 22 which are held in place by bolts 24, bolts 24 engaging plate 10. Covers 20,22 serve the dual functions of protecting the components of the drive mechanism and lending a streamlined, pleasing appearance to the wheel.

The plate 10 will typically be of circular configuration and, of course, will be coaxial with the rim defining member 12. The shape of plate 10 may, however, be varied to achieve a balanced assembly which includes the batteries and the drive components to be described below.

It should be noted, referring to FIG. 4, that the rim defining member 12 may be fabricated from a commercially available molded wheel by cutting the spokes adjacent the rim and substituting plate 10 and the components to be described below for the inwardly disposed portions of the spokes and the hub of the molded wheel.

Continuing to refer to FIG. 4, a pair of batteries 26, 28 are fitted into rectangular holes provided in plate 10.

The batteries 26, 28 are preferably of the sealed lead-acid type with a gelled electrolyte. Brackets 30, 31 are affixed to plate 10 to hold the batteries 26, 28 in place. The number of battery retaining brackets employed and their locations may vary. In order to facilitate battery changing, access to the batteries being achieved through removal of the outboard cosmetic cover 20, at least some of the brackets 31 will be affixed to plate 10 by means of easily removable fasteners. As an alternative, battery supports may be provided on the inside of the cosmetic cover 20 and the batteries will be removed from the wheel upon removal of the cover.

Figure 2:
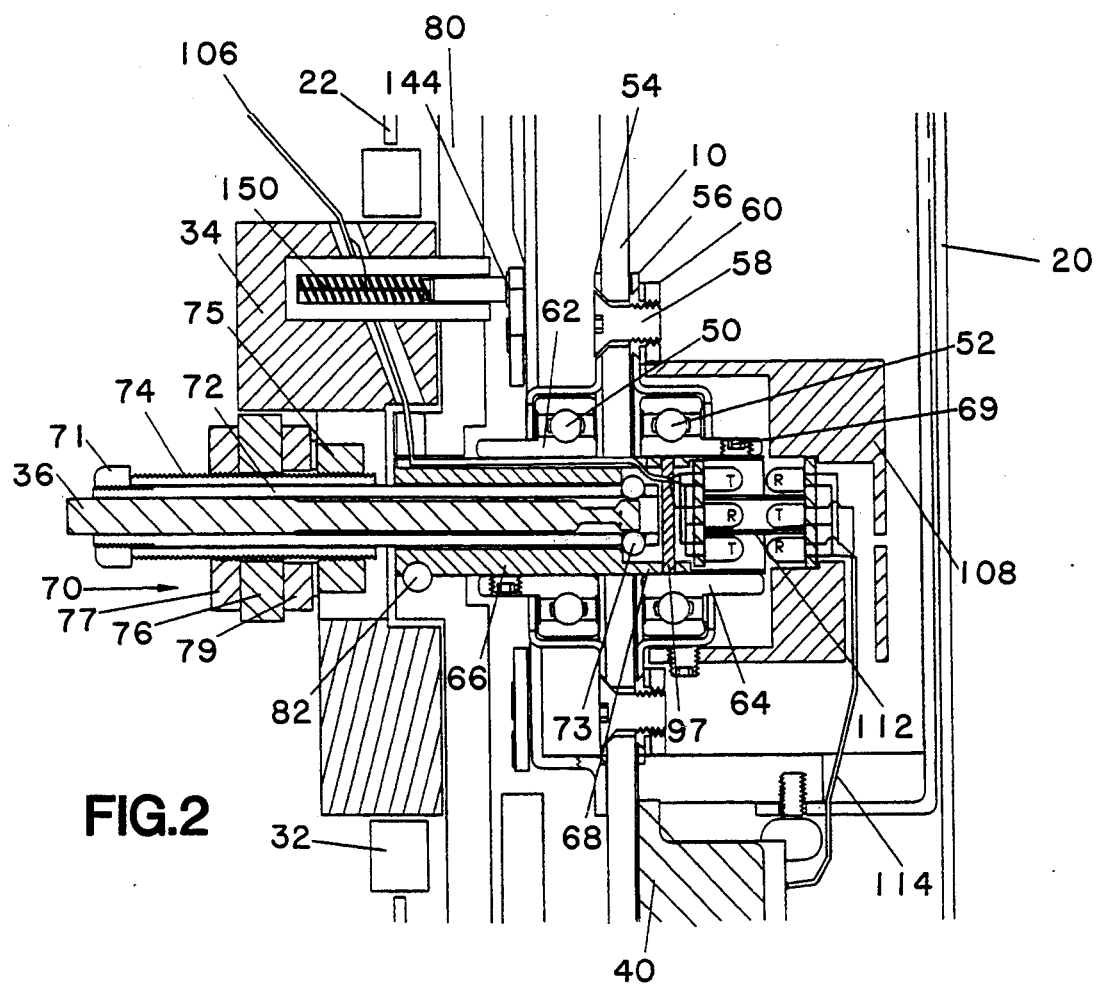
FIG. 2 is an enlarged view of a portion of the apparatus of FIG. 1, FIG. 2 being a view taken in the same direction as FIG. 1 and depicting the components located at or near the axle of the wheel.
Figure 3:
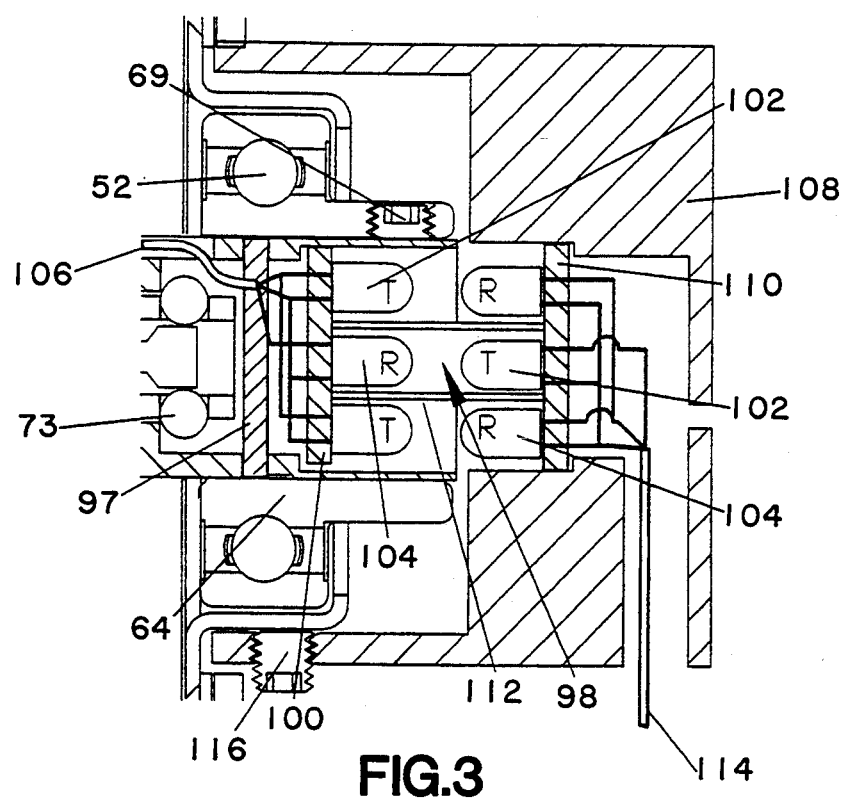
FIG. 3 is an enlarged view of the photo-optic chamber of the apparatus of FIGS. 1 and 2.

Referring to FIGS. 1 and 2, the inboard cosmetic cover 22 is provided with an axially disposed, circular opening. An oil seal 32 is provided about the circumference of this opening to protect the drive mechanism from the ambient environment. Seal 32 thus extends between the cover 22 and an anti-rotation block 34 which will be described in greater detail below. In the disclosed embodiment, the stationary axle assembly about which the self-propelled wheel rotates includes the pin 36 of a guick release mechanism. The pin 36 extends through and is coaxial with the block 34.

The drive motor for the wheel has been indicated schematically at 40 in FIGS. 1 and 4. Motor 40 is a direct current responsive disc or pancake motor which is characterized by a flat shape. In one reduction to practice of the invention, a suitable motor was obtained from PMI Motion Technologies of Commack, N.Y. The housing for motor 40, i.e., one of the end plates of the motor, is affixed to plate 10 in any suitable manner. The motor output shaft 42, which is affixed to the rotor disc, extends through plate 10 and a bearing assembly 44. Bearing assembly 44 is supported on plate 10.

Before discussing the planetary drive of the disclosed embodiment of the invention, the means by which the wheel is supported for rotation about the stationary axle assembly will be described. Referring to FIGS. 1 and 2, bearing assemblies 50 and 52 are located adjacent to and on opposite sides of support plate 10. The outer race defining member of each of these bearing assemblies is provided with a radially outwardly extending flange, the flanges respectively being indicated at 54 and 56. These flanges are provided with apertures which receive bolts 58. The bolts 58 extend through the flanges and plate 10 and are engaged by nuts 60. The inner race defining members of bearing assemblies 50 and 52 are in the form of precision cut sleeves, respectively indicated at 62 and 64 in FIG. 2. A further sleeve 66 is received in sleeve 62 and an extension 68 of sleeve 66 is received in sleeve 64. Sleeve 66 functions as a secondary axle while the pin 36 functions as the primary axle.

The bearing assemblies 50, 52 define the interface between the rotating and stationary components of the self-propelled wheel of the invention, i.e., the inner races of the bearings are stationary and the outer races with their flanges 54 and 56 comprise rotating members. In order to insure that the inner race defining members 62 and 64 do not rotate relative to one another, i.e., to make the inner races function as a continuous receiver for sleeve 66 and its integral extension 68, a plurality of set screws 69 are provided in each of the inner races. The set screws 69 engage the sleeve 66 and sleeve extension 68. For purposes to be described below in the discussion of the control portion of the wheel, the inner diameter of a portion of sleeve extension 68 is enlarged at the end disposed in facing relationship to the outboard cosmetic cover 20.

As should be obvious, in the use of the present invention, the stationary axle about which the self-propelled wheel rotates must be maintained perpendicular to the plane of the wheel as defined by the support plate 10. Additionally, in order to permit the wheel of the present invention to be mounted to the frame of a commercially available chair, the axle of the wheel must be interchangeable with the axle of the chair on which it is to be installed. Current wheelchairs employ axles which are either "permanently" secured to a vertical member of the wheelchair frame or axles which may be disconnected from a vertical frame member through the use of a coupling in the form of a quick release pin. Those axles which are "permanently" secured typically are screwed into a threaded hole in the frame member, i.e., the axles are simple bolts with external threads. For purposes of explanation, the embodiment of the invention which has been disclosed is intended for use on a wheelchair which has readily detachable wheels since such chairs are usually deemed more desirable in view of the ability to separate the wheels from the frame in order to minimize space requirements during transportation in the storage compartment of a vehicle.

Referring again to FIGS. 1 and 2, the primary axle 36 comprises part of a quick release mechanism which will be briefly described below. This quick release mechanism includes an adjustable bracket assembly which has been indicated generally at 70. Bracket assembly 70 is provided on the wheelchair frame for the purpose of permitting the axial position of the wheel relative to the seat of the chair to be varied.

To briefly describe a prior art quick-release mechanism as employed on a self-propelled wheel in accordance with the present invention, the mechanism includes the axle pin 36, the bracket assembly 70, a nut 71, a sleeve 72, balls 73 and a collar 74. The bracket assembly 70, in turn, includes a nut 75, a block 76, a further nut 77 and a spacer member 79. As may be seen from FIGS. 1 and 2, the nut 71 engages sleeve 72 and thus permits fine adjustment of the distance of the wheel from the frame. The cooperation between nuts 75 and 77 permits a gross adjustment of the closeness of the wheel to the frame.

In contradistinction to the manner in which such mechanisms are employed on present manually propelled chairs, the quick release pin, i.e., the primary axle 36, is installed from the inside of the chair toward the outside. Thus, pin 36 will first be passed through the block 76 and its associated collar 74 and then into the wheel axle assembly. This manner of installation, for the reasons to be discussed below, provides room for a photo optic chamber which is employed for control signal transmission purposes.

The quick release mechanism is, as noted above, of conventional design and includes spring loaded balls 73 which mechanically couple pin 36 to sleeve 66. The application of axial force to pin 36 causes the balls 73 to be withdrawn into a recess provided therefor in pin 36 and allows subsequent separation of the pin from the sleeve. The pin 36 is inserted into sleeve 66 until it reaches a stopping pin 97. Stopping pin 97 is pressed into, and extends across, sleeve 66.

The rectangular block 76 of the release mechanism cooperates with anti-rotation block 34. Thus, the anti-rotation block 34 is provided with an outwardly extending boss having a flat surface which engages a complementary surface on block 76. Block 76, in the customary manner, is attached to the frame of the chair. Since the distance between the axis of the wheel and the most distant point of contact between the boss on anti-rotation block 34 and the block 76 is very short, the force required to prevent the anti-rotation block 34 from rotating about the stationary axis is minimized. In one reduction to practice of the invention the lever arm of the torque transmitted to the frame, i.e., the distance between the axis of rotation and the contact between the block 34 and block 76, was one inch. Thus, the stresses applied to the frame of a wheelchair which has been retrofitted with self-propelled wheels in accordance with the present invention will be minimal.

To summarize, the compound axle assembly of the present invention consists essentially of three concentric members, i.e., the quick-release pin assembly 36, the sleeves 66, 68 and the inner race defining members 62, 64 respectively of bearings 50, 52. The axle assembly is mechanically coupled to the anti-rotation block 34 by the block 76 of the wheel release mechanism and is thus also coupled to the frame of the chair.

The principal non-rotating component of the drive system comprises the gear 80 of the planetary gear drive. Gear 80 is provided with an outwardly extending hub portion 81. The anti-rotation block 34 is press fit onto the hub 81 of gear 80. The sleeve 66, which functions as the secondary axle, is press fit into the bore of the hub portion of gear 80. The relative positions between block 34, sleeve 66 and gear 80 is maintained by means of a tapered set pin 82. Pin 82, as may be seen from joint consideration of FIGS. 2 and 4, is received in a hole provided in anti-rotation block 34. Pin 82 engages a recess in the outer circumference of sleeve 66 and a facing recess in the internal diameter of the hub portion of gear 80.

The planetary drive of the disclosed embodiment of the present invention includes, in addition to stationary gear 80, three rotating gears. The first of these rotating gears is pinion gear 84 which is affixed to the output shaft 42 of motor 40. As noted above, and as may be seen from FIG. 1, the output shaft 42 of motor 40 is supported in plate 10 by means of bearings 44. Pinion gear 84 engages, and thus drives, gear 86. Gear 86 is mounted for rotation about a shaft 90, mounted on plate 10, and is supported for rotation by means of another set of bearings, not shown, which are identical in construction to the bearings 44.

The bearings 44 as well as the bearings for the shaft 88 are held in position on support plate 10 by a common rectangular bearing retainer 91. Gear 86, in turn, has a further gear 92 fixedly mounted thereon. This further gear 92 engages the stationary gear 80. Since gear 80 is prevented from rotating, rotation of the output shaft 42 of motor 40 will result in the motor being driven about gear 80. An end plate of motor 40 is affixed to plate 10 and, accordingly, the motion of the motor will be converted into rotation of plate 10, and thus the wheel assembly, about the stationary axle assembly.

As discussed above, the motor 40 is a disc or pancake type motor. In one reduction to practice of the invention, a motor comprising a ferrite disc was employed. The use of a motor with a ferrite disc is advantageous since the disc is thin and has very little inertia. Additionally, the back EMF produced by such a motor is minimal, such minimal back EMF further reducing inertia and minimizing arcing and thus minimizing brush wear. The minimum inertia of the armature of a ferrite disc motor reduces the effort required to manually propel a chair on which the present invention has been installed when the motor is deenergized. It is also to be noted that a disc motor has practically constant torque available from zero to full speed. This is advantageous in the case of a wheelchair where maximum torque is required at the lowest speed.

As an alternative to the gearing arrangement discussed above, a first gear reduction may be built into the motor housing. While this approach increases the width of the motor, the additional width is not greater than the space required by gears 86 and 92 of the disclosed embodiment. In this alternative arrangement, the pinion on the motor shaft will directly mesh with the central gear 80. The advantage of the alternate arrangement primarily resides in noise reduction since it places the faster rotating gears inside of the motor housing.

It is to be noted that the support plate 10 can be fabricated as a casting. When such a casting is utilized it may be provided with a recess for receiving the motor. Regardless of whether the motor is bolted to plate 10 or tightly held in a recess, the plate will function as a heat sink.

The end of the stationary axle subassembly which is positioned closest to the outboard cosmetic cover 20 defines a portion of a photo optic chamber which is indicated generally at 98, i.e., the sleeve extension 68 has an enlarged inner diameter which is employed for data transmission purposes. A circuit board 100 is positioned within the axle sleeve extension and supports infrared signal generators 102 (indicated by "T") and infrared signal responsive detectors 104 (indicated by "R"). In the embodiment of FIGS. 1-5, these signal generators and detectors are connected, via a multi-conductor cable 106, to a control signal generator 107 which will be described below. Referring to FIGS. 1 and 2, it may be seen that cable 106 extends through the anti-rotation block 34 and along a groove provided therefor on the outer circumference of the sleeve 66.

The photo optic chamber 98 is also in part defined by a cap 108 which is affixed to and rotates with plate 10. A second circuit board 110 is mounted within cap 108 and supports a further infrared transmitter 102' and detectors 104' which cooperate respectively with the transmitters and detectors mounted on the circuit board 100. In the disclosed embodiment, a single infrared transmitter is mounted on board 110 on the axis of rotation of the wheel and a cooperating infrared receiver is mounted in aligned relationship thereto on board 100.

A circular array of infrared transmitters, the array being coaxial with the axis of rotation of the wheel, are mounted on board 100 and cooperate with a circular array of detectors mounted on board 110. In order to isolate the communication channel defined by the axially mounted transmitter and detector from the communication channel defined by the aligned circular arrays of transmitters and detectors, a thin cylinder 112 may be provided, cylinder 112 being mounted on circuit board 100. The cylinder 112 will prevent "crosstalk" between the two communications channels. The transmitters and detectors mounted on board 110 are connected, via a multi-conductor cable 114, to the electronic circuitry which is mounted on the wheel. In the disclosed embodiment, the cap 108 is affixed to the plate 10 for rotation therewith by being held in position against the flange 56 on the outer race of bearing assembly 50 by means of set screws 116.

It is important to establish proper spacing between the printed circuit boards 100 and 110 to achieve reliable data transmission. Also, the surfaces of the cylinder 112 and the inner surface of the optic chamber 98 will be provided with reflective surfaces to contain the transmissions. As is known in the art, infrared transmitters of the type suitable for use in the practice of the present invention have slightly diverging beams. Accordingly, the aligned coaxial arrays of receivers and transmitters do not have to be contiguous in their circular configuration. However, the gap between the transmitters and receivers must be selected so as to insure, taking into account the divergence of the optical signals, that the transmitted signals will impinge upon the receivers.

Figure 5:
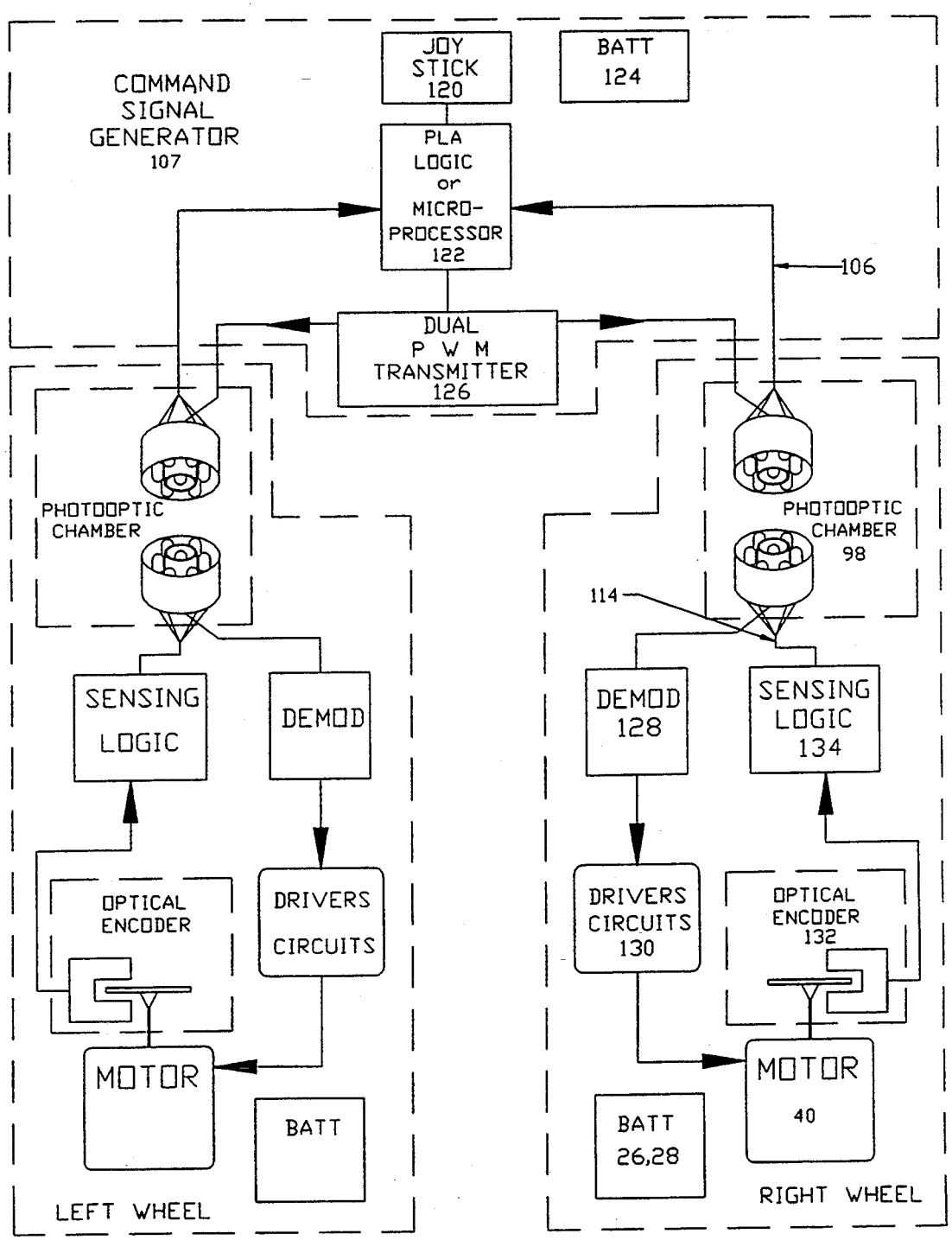
FIG. 5 is a block diagram depicting a first embodiment of the control circuitry for the embodiment of the invention depicted in FIGS. 1-4.

FIG. 5 is a circuit block diagram for a complete, i.e., two wheel, drive system which employs the present invention. In the system of FIG. 5, command signals will be produced through manipulation of a joy stick 120 by the user of the chair. Control signal generators which employ joy sticks as the input device are well known in the art and, for example, are utilized on XY plotting tables. Such command signal generators may employ variable resistors or inductors which provide variable output voltages in a XY coordinate system. These variable voltages may be delivered to a programmed logic array (PLA). The programmed logic array, in turn, may convert the variable voltages into pulse width modulated command signals. Alternatively, the variable voltages provided by the tranducers associated with the joy stick may be delivered to a microprocessor 122 mounted on the chair, power for the microprocessor being provided by a small battery 124. The microprocessor, in addition to receiving signals from the joy stick 120, will receive signals fed back from the wheel. The feedback signals are generated in the manner to be described below and will typically be commensurate with the speed and direction of rotation of each wheel and will be coupled between the rotating and non-rotating components of the wheel via one of the optical data transmission channels. Microprocessor 122 will generate control signals which are delivered to a dual pulse width modulator 126 which produces separate pulse width modulated signals for optical transmission to the two wheels.

Continuing with a discussion of the control circuitry, the optical signals received at the rotating wheel will be demodulated, in a demodulator 128, and applied to appropriate driver circuitry 130 which produces the control signals applied to the motor 40. Thus, in the manner well known in the art, signals commensurate with differences between the actual and desired speed of each wheel will be pulse width modulated, transmitted from the stationary portion of the chair to the rotating wheel, demodulated and employed to control the delivery of drive current to the armature of the motor.

An optical encoder 132 will be provided for each motor for generating, in the known manner, the signals commensurate with the rotational speed and direction of rotation of the wheel which are to be fed back to microprocessor 122. The signals provided by the optical encoder are converted, by conventional sensing logic 134, into signals in a form interpreted by the PLA logic and, alternatively, intelligible to microprocessor 122. In the manner described above, these encoded signals are optically transmitted from the wheel to the chair frame. It is to be noted that optical encoders are commercially available which provide information commensurate with both speed and direction of rotation in digital format.

It is also to be noted that the present invention can be operated without the feedback of speed and/or rotational direction information from the wheel. In such case, the circular array of infrared transmitters and detectors may be omitted.

Figure 6:
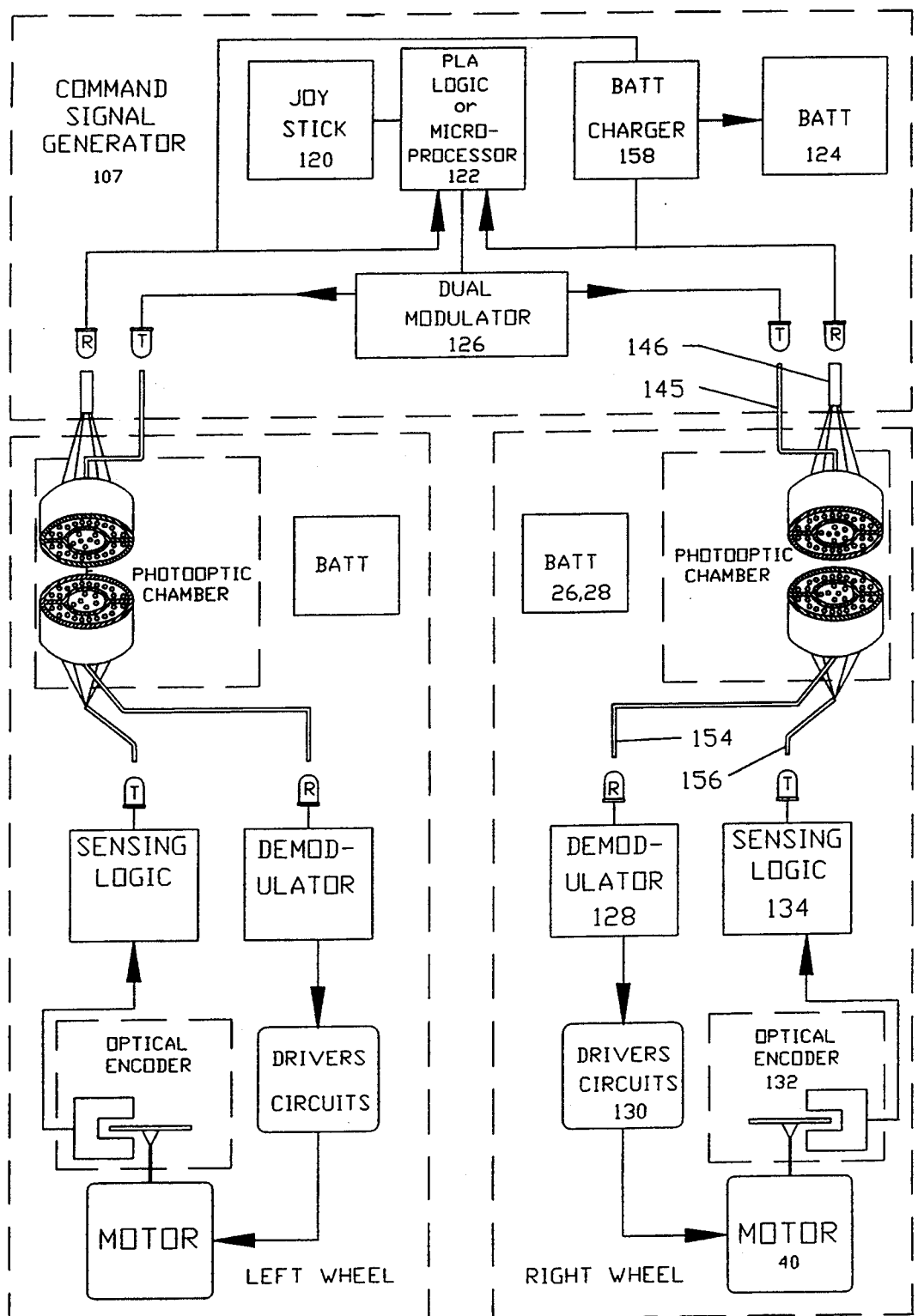
FIG. 6 is a block diagram of an alternative control circuit in accordance with the invention.
Figure 7:
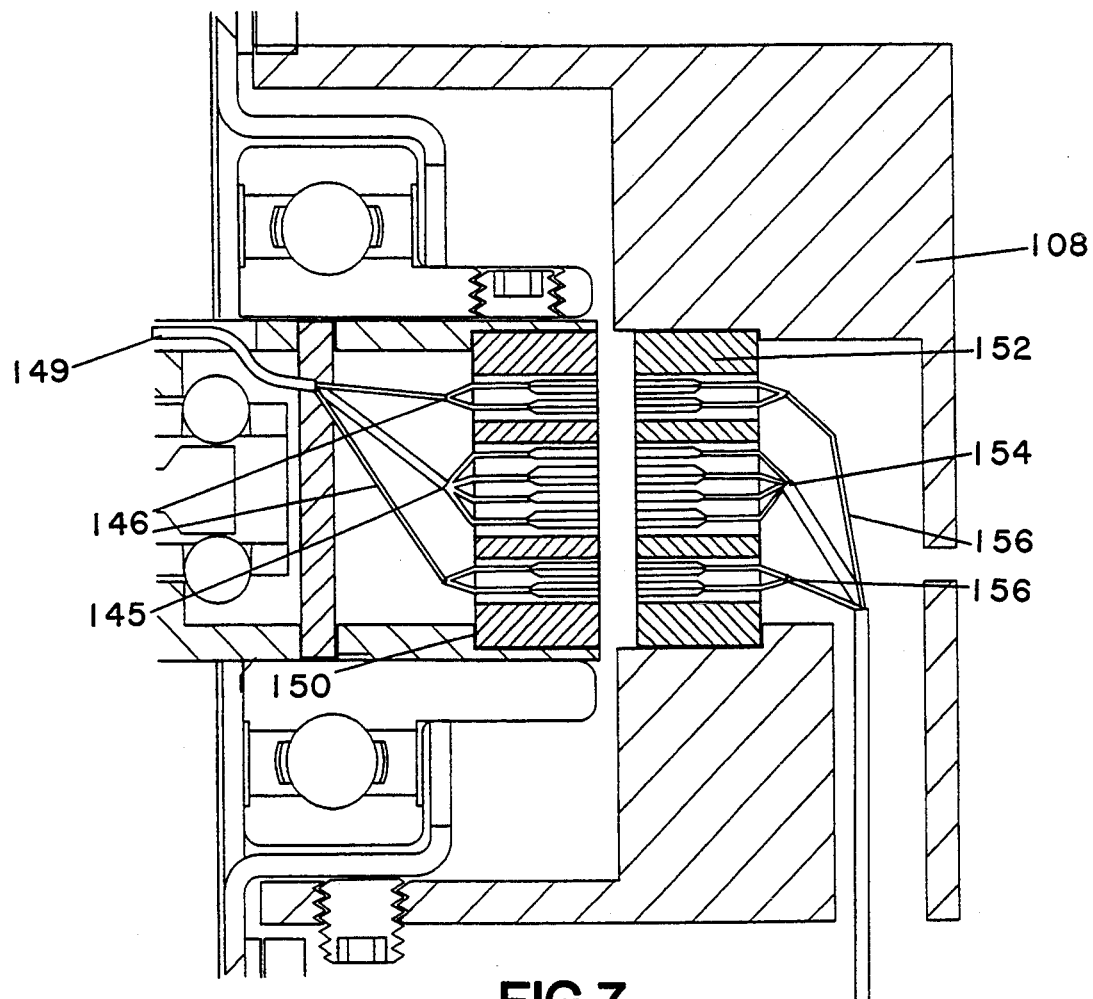
FIG. 7 is an enlarged view of the photo-optic chamber of the control circuit embodiment of FIG. 6.

FIG. 6 depicts a modified form of the invention wherein optical data transmission is utilized between the command signal generator 107 and the wheel. Thus, in the embodiment of FIG. 6, the multiconductor electrical cable 106 is replaced by fiber optic bundles 145 and 146 and the static infrared transmitter and receivers are located in the control module. Likewise, in the wheel, fiber optic bundles 154 and 156 are employed to deliver the optically transmitted data from the photo optic chamber to an infrared detector and signal generators. Thus, in the photo optic chamber, rather than mounting infrared receivers and detectors on circuit boards, the ends of the fiber optic bundles will be suitably positioned relative to one another. Such an arrangement is shown in the enlarged view of FIG. 7 wherein a pair of cylindrical retainers 150 and 152 are employed for the termination of the optical fibers. The retainers 150 and 152 are, in the disclosed embodiment, constructed in the form of a pair of coaxial cylinders. It will be obvious to those skilled in the art that more than two coaxial spaces for terminating the facing ends of the optical fiber bundles can be utilized. It will also be apparent to those skilled in the art that the axial space, i.e., the space within the smaller cylinder defined by retainers 150 and 152, may be used to accommodate an axle rather than being used for data transmission purposes. The arrangement of FIGS. 6 and 7 has the advantage that control of the spacing, i.e., the size of the gap within the photo optic chamber, does not have to be as precisely controlled as is the case with the embodiment of FIG. 5.

The command signal generator, as noted above, includes a battery 124 which provides operating power therefor. In accordance with a preferred embodiment of the invention, this battery may be rechargeable and the power for accomplishing such recharging may be derived from the batteries 26, 28 mounted on the wheel and without resorting to mechanical commutators. Thus, referring to FIG. 6, in addition to being connected to microprocessor 22, the output of the static receiver infrared signal generators is also connected to a battery charger 158. The majority of the current produced as a result of receiving infrared information bearing signals from the wheel via optical fiber bundles 156 and 146 may thus be diverted for the purpose of charging battery 124. The battery charger 158 may be of the type found in solar powered calculators. This type of battery charging arrangement is particularly well suited for use with pulse width modulation of the signals which are being fed back from the wheel to the control module since a signal will be present in the fibers constituting bundle 146 for a large portion of the time the system is in operation.

It is further to be noted that a connector, not shown, will be provided on the wheel in order to permit the coupling of a battery charger to the batteries 26, 28. Such a connector will typically include a switch which will disconnect all of the control circuitry and the motor from the battery during charging.

It is additionally to be noted that, when the chair is to be propelled manually via the hand rims 18, the batteries will typically be disconnected from the motor by a switch. This switch and the connector for charging the batteries 26, 28 on the wheel will be located under the sloping section of the inboard plastic cover. In order to gain access to this connector and switch a cap, not shown, is provided. This cap will be mechanically affixed to the cosmetic cover to prevent dust, water, etc. from gaining access to the components in the wheel.

Referring again to FIGS. 1 and 2, the invention may also be provided, as an option, with the ability to recharge the batteries while the chair is moving. Such a recharging system includes a battery charger, not shown, which is connected to a commutator arrangement which includes brush subassembly 142 mounted on the stationary portion of the chair and slip rings 144 mounted on a rotating portion so as to be coaxial with the rotation axis of the wheel. The brush subassembly 142 is mounted in retainers which are press fit into the anti-rotation block 34. The slip rings 144 comprise a printed circuit board which defines at least two brush contact rings, the circuit board being supported from plate 10 as shown. As will be obvious to those skilled in the art, recharging while the chair is in motion would require the installation of a small generator which is driven by the rotating wheel.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for producing rotary motion about an axis, said axis being defined by a frame, said apparatus comprising:

stationary axle means, said axle means being supported from the frame and being coaxial with said axis;

support plate means;

means mounting said support plate means for rotation about said axle means;

wheel means rigidly coupled to the periphery of said support plate means, said wheel means including a rim and a tire, said wheel means being coaxial with said axis, said wheel means and plate means rotating as a unit;

an electric motor mounted on said plate means, the center of gravity of said motor being radially displaced from said axis, said motor having a rotatable output shaft;

battery means supported for rotation with said plate means;

means for controllably supplying electrical current from said battery means to said motor, said current supplying means being mounted on said plate means for rotation with said plate means;

signal generator means mounted on the frame for generating rotational command signals;

means for delivering rotational command signals generated by said command signal generator means to said current supplying means; and drive train means coupling said motor output shaft to said axle means whereby energization of said motor causes said support plate means to be driven about said axle means, the relative positioning of said motor, battery means, current supplying means and drive train means being selected so that said wheel means has a substantially balanced weight distribution.

2. The apparatus of claim 1 wherein said battery means comprises at least a first battery and wherein said support plate means is provided with a recess for receiving each said battery.

3. The apparatus of claim 1 wherein said axle means comprises:
- a primary axle; and
- secondary axle defining means, said secondary axle defining means being coaxial with said primary axle, said secondary axle defining means extending along at least a portion of the length of said primary axle, said means mounting said support plate for rotation engaging said secondary axle defining means.

4. The apparatus of claim 3 wherein said primary axle and secondary axle defining means cooperate to define a quick release mechanism, said primary axle comprising a pin which may be inserted in and withdrawn from said secondary axle defining means.

5. The apparatus of claim 1 wherein said drive train means comprises:
- a first gear;
- means mounting said first gear coaxially with said axle means, said gear mounting means fixing the rotational position of said first gear; and
- means coupling said motor output shaft to said first gear whereby said motor means will rotate about said first gear when energized to thereby cause rotation of said wheel, said motor output shaft coupling means including at least a second gear which meshes with said first gear.

6. The apparatus of claim 5 wherein said electric motor comprises a ferrite disc motor.

7. The apparatus of claim 1 wherein said electric motor comprises a ferrite disc motor.

8. Apparatus for producing rotary motion about an axis, said axis being defined by a frame, said apparatus comprising:
- stationary axle means, said axle means being supported from the frame and being coaxial with said axis, said axle means including:
  - a primary axle; and
  - secondary axle defining means, said secondary axle defining means being coaxial with said primary axle, said secondary axle defining means extending along at least a portion of the length of said primary axle and including first sleeve means and an anti-rotation block mounted on and extending outwardly from said sleeve means, said anti-rotation block engaging a cooperating surface on the frame whereby rotation of said secondary axle defining means relative to the frame is prevented, said secondary axle defining means further including second sleeve means mounted on said first sleeve means;
- support plate means;
- bearing means for mounting said support plate means for rotation about said axle means, said bearing means engaging said secondary axle defining means and having inner and outer races, said bearing means inner race being affixed to said second sleeve means;
- wheel means rigidly coupled to the periphery of said support plate means, said wheel means including a rim and a tire, said wheel means being coaxial with said axis, said wheel means and plate means rotating as a unit.
- an electric motor mounted on said plate means, the center of gravity of said motor being radially displaced from said axis, said motor having a rotatable output shaft;
- battery means supported for rotation with said plate means;
- means for controllably supplying electrical current from said battery means to said motor, said current supplying means being mounted on said plate means;
- signal generator means mounted on the frame for generating rotational command signals;
- means for delivering rotational command signals generated by said command signal generator means to said current supplying means; and
- drive train means coupling said motor output shaft to said axle means whereby energization of said motor causes said support plate means to be driven about said axle means, the relative positioning of said motor, battery means, current supplying means and drive train means being selected so that said wheel means has a substantially balanced weight distribution.

9. The apparatus of claim 8 wherein said drive train means comprises:
- a first gear;
- means mounting said first gear coaxially with said axle means, said gear mounting means fixing the rotational position of said first gear; and
- means coupling said motor output shaft to said first gear whereby said motor means will rotate about said first gear when energized to thereby cause rotation of said wheel, said motor output shaft coupling means including at least a second gear which meshes with said first gear.

10. The apparatus of claim 9 wherein said electric motor comprises a ferrite disc motor.

11. The apparatus of claim 10 wherein said command signal generator means provides electrical signals and wherein said command signal delivering means comprises:
- means for transducing electrical command signals into optical signals;
- means for transmitting said optical signals between stationary and rotating components of said apparatus;
- means mounted on said support plate means for transducing transmitted optical signals into electrical command signals; and
- means for applying said electrical command signals from said second transducing means to said means for controllably supplying current to said motor.

12. The apparatus of claim 11 wherein said optical signal transmitting means is coaxial with the axis and includes:
- means defining a photo-optic chamber which extends about said axis, said chamber defining means being at least in part mounted on said support plate means;
- means located within said chamber for receiving optical command signals;
- means located within said chamber and generally in axial alignment with said receiving means for transmitting optical command signals, said optical signal transmitting means being affixed to said axle means.

13. The apparatus of claim 12 wherein said battery means comprises at least a first battery and wherein said support plate means is provided with a recess for receiving each said battery.

14. The apparatus of claim 10 wherein said battery means comprises at least a first battery and wherein said support plate means is provided with a recess for receiving each said battery.

15. Apparatus for producing rotary motion about an axis, said axis being defined by a frame, said apparatus comprising:
stationary axle means, said axle means being supported from the frame and being coaxial with said axis;
support plate means;
means mounting said support plate means for rotation about said axle means;
wheel means rigidly coupled to the periphery of said support plate means, said wheel means including a rim and a tire, said wheel means being coaxial with said axis, said wheel means and plate means rotating as a unit;
an electric motor mounted on said plate means, the center of gravity of said motor being radially displaced from said axis, said motor having a rotatable output shaft;
battery means supported for rotation with said plate means;
means for controllably supplying electrical current from said battery means to said motor, said current supplying means being mounted on said plate means;
signal generator means mounted on the frame for generating electrical rotation command signals;
means for transducing said electrical rotation command signals into optical signals;
means for transmitting said optical signals between stationary and rotating components of said apparatus;
means mounted on said support plate means for transducing transmitted optical signals into electrical control signals for controlling said means for controllably supplying electrical current to said motor;
means for applying said electrical control signals from said support plate means mounted transducing means to said means for controllably supplying current to said motor; and
drive train means coupling said motor output shaft to said axle means whereby energization of said motor means causes said support plate means to be driven about said axle means, the relative positioning of said motor, battery means, current supplying means and drive train means being selected so that said wheel means has a substantially balanced weight distribution.

16. The apparatus of claim 15 wherein said optical signal transmitting means is coaxial with the axis and includes:
means defining a photo-optic chamber which extends about said axis, said chamber defining means being at least in part mounted on said support plate means;
means located within said chamber for receiving optical command signals;
means located within said chamber and generally in axial alignment with said receiving means for transmitting optical command signals, said optical signal transmitting means being affixed to said axle means.

17. The apparatus of claim 16 wherein in said optical signal transmitting and receiving means define a pair of spacially displaced optical data transmission paths, said data transmission paths being arranged coaxially.

18. The apparatus of claim 17 further comprising:
shield means for at least in part isolating said optical data transmission paths from one another.

19. The apparatus of claim 15 wherein at least of one of said transmitting and receiving means comprises a bundle of optical fibers.

20. The apparatus of claim 15 wherein said optical data receiving means comprises an infrared energy responsive signal generator and wherein said optical signal transmitting means comprises an infrared signal generator.

* * * * *